(12) United States Patent
Iida

(10) Patent No.: US 6,785,023 B1
(45) Date of Patent: Aug. 31, 2004

(54) NETWORK FACSIMILE APPARATUS

(75) Inventor: Junichi Iida, Yokohama (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 0 days.

(21) Appl. No.: 09/343,716

(22) Filed: Jun. 30, 1999

(30) Foreign Application Priority Data

Jan. 28, 1999 (JP) ............................................. 11-019591

(51) Int. Cl.$^7$ .......................... H04N 1/32; G03G 15/00
(52) U.S. Cl. ......................... 358/442; 358/1.15; 398/8
(58) Field of Search ...................... 358/1.15, 402–407, 358/442, 468; 379/100.01, 100.03, 100.05, 100.06, 100.08, 100.09, 100.12; 709/206; 399/8–13, 21, 24, 49, 61, 62, 79, 80–81

(56) References Cited

U.S. PATENT DOCUMENTS

| | | | |
|---|---|---|---|
| 5,675,507 A | 10/1997 | Bobo, II | |
| 5,724,555 A | 3/1998 | Wadsworth | 358/468 |
| 5,881,233 A | 3/1999 | Toyoda et al. | |
| 5,901,286 A | 5/1999 | Danknick et al. | 709/203 |
| 5,937,151 A * | 8/1999 | Kadota | 358/1.15 |
| 5,946,458 A | 8/1999 | Austin et al. | |
| 6,209,048 B1 | 3/2001 | Wolff | 710/62 |
| 2001/0043339 A1 * | 11/2001 | Saruwatari et al. | 358/1.9 |

FOREIGN PATENT DOCUMENTS

| | | |
|---|---|---|
| EP | 0845894 | 6/1998 |
| EP | 0867817 | 9/1998 |
| JP | 7-79307 | 3/1995 |
| JP | 09307690 | 11/1996 |
| JP | 9-18639 | 1/1997 |
| JP | 09128207 | 5/1997 |
| JP | 9-128207 | 5/1997 |
| JP | 09181723 | 7/1997 |
| JP | 09244860 | 9/1997 |
| JP | 9-244860 | 9/1997 |
| JP | 9307690 | 11/1997 |
| JP | 090307690 | * 11/1997 | ............ H04N/1/00
| JP | 9-325925 | 12/1997 |
| JP | 10107836 | * 4/1998 | ........... H04L/12/54
| JP | 10164115 | 6/1998 |
| JP | 10173890 | 6/1998 |
| JP | 10191010 | 7/1998 |
| JP | 10269039 | 9/1998 |
| JP | 10269039 | 10/1998 |
| JP | 10301731 | 11/1998 |
| WO | 97/09682 | 3/1997 |

OTHER PUBLICATIONS

English Language Abstract for JP Appl. No. 09–181723.
Takayuki Hourin, "RT80i/C&C–NET IP45/007 Type 1/MU-CHO–TL–DSU, DOS/V Power Report," *DOS/V Power Report*, Feb. 98, pp. 219–221, with an English translation.
English language abstract of JP 9–244860.
English language abstract of JP 9–128207.
English Language Abstract of JP 10–164115.
English Language Abstract of JP 10–173890.
English Language Abstract of JP 7–79307.
English Language Abstract of JP 10–191010.
English Language Abstract of JP 9–18639.
English Language Abstract of JP 9–325925.

* cited by examiner

*Primary Examiner*—Twyler Lamb
(74) *Attorney, Agent, or Firm*—Greenblum & Bernstein, P.L.C.

(57) ABSTRACT

The network facsimile apparatus switches a status icon registered in a structured document for displaying a status icon, corresponding to a status change, while transmitting the structured document corresponding to a request from a client. Thus the apparatus enables the client to observe the latest status icon in homepage format.

26 Claims, 12 Drawing Sheets

STATUS.HTML    Page1

```
<HTML><HEAD>
<TITLE>MMF INFORMATIONWeb</TITLE>
<META HTTP-EQUIV="Refresh" CONTENT="60">
</HEAD><BODY BGCOLOR="#ffffff">
<B><FONT SIZE=2><A HREF="status.htm"<STATUS</A><BR>
<IMG SRC="pn100.gif" BORDER="0">
<IMG SRC="prt00.gif" BORDER="0">
<IMG SRC="scn00.gif" BORDER="0">
<IMG SRC="fax00.gif" BORDER="0">
</FONT></B><BR><TABLE BORDER="0"><TR><TD WIDTH="100">  </TD>
<TD WIDTH="125" ALIGN="center">  </TD>
<TD WIDTH="125" ALIGN="center">  </TD>
<TD WIDTH="125" ALIGN="center">  </TD>
</TR></TABLE><BR></BODY></HTML>
```

FIG. 8

| PRINTER STATUS NUMBER | FILE NAME |
|---|---|
| 0 0 0 1 (TONER CHECK) | prt01.gif |
| 0 0 0 2 (OUT OF PAPER) | prt02.gif |
| 0 0 0 3 (JAM OF PAPER) | prt03.gif |
| ⑤ | |

NETWORK FACSIMILE APPARATUS

BACKGROUND OF THE INVENTION

1. Field of the Invention

The present invention relates to a network facsimile apparatus capable of performing transmission and reception of facsimile data and e-mail data connecting to a PSTN and a network such as the internet or LAN.

2. Description of the Related Art

Recently, a method of reusing facsimile received data by combining an internet FAX and a WWW server has been proposed. The method utilizes the function of the internet FAX which converts data received from the PSTN into an e-mail.

Figure 1:
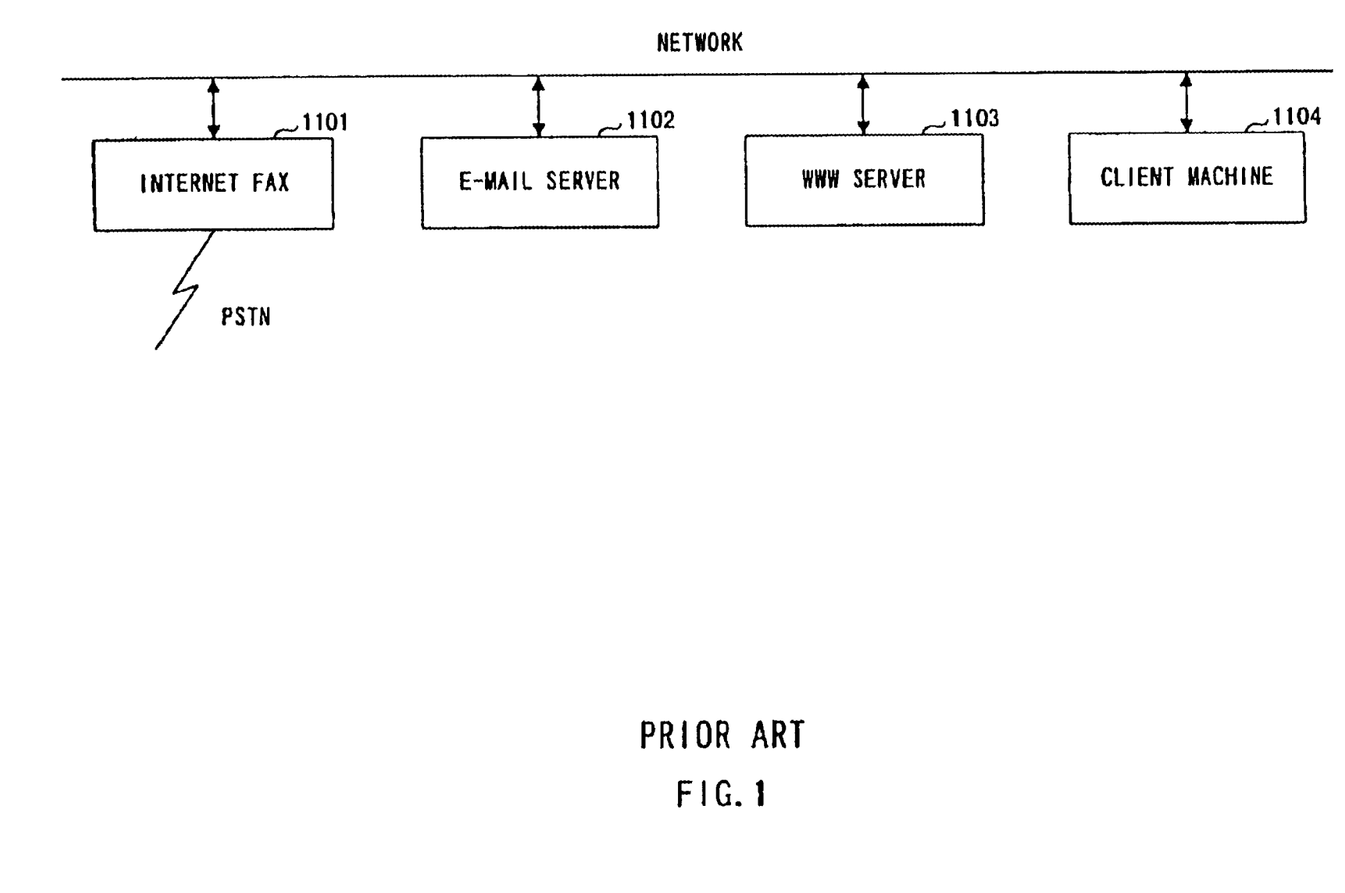
FIG. 1 is a configuration diagram of a facsimile communication system using a conventional internet FAX and a WWW server.

FIG. 1 illustrates a system structure of the case of performing facsimile transmission and reception using an internet FAX and a WWW server.

Image data received at internet FAX 1101 via the PSTN is converted into an attached file format to an e-mail at internet FAX 1101 and is transmitted to WWW server 1103 as an attached file of e-mail.

The e-mail with the attached file transferred from internet FAX 1101 is received at e-mail server 1102 via a network. The e-mail with the attached file received at e-mail server 1102 is transferred to WWW server 1103 that is a destination again via the network.

WWW server 1103 stores the attached file of e-mail as image data to link to a homepage for facsimile reception. The storage of facsimile received data is finished at this point.

In order to fetch received data into client machine 1104, a user starts a WWW browser at client machine 1104 and accesses to the homepage for facsimile reception at WWW server 1103. The user reads out an image data file at client machine 1104 via the network from WWW server 1103.

The above facsimile communication system remains the problem that the network traffic is increased because the image data with large capacity is transferred over a network many times. Incorporating a WWW server to an internet facsimile is an effective way to suppress increases of network traffic. In this case, a larger number of users use the internet facsimile incorporated with a WWW server than a traditional facsimile because a sender and a recipient both access to the internet facsimile.

In the case where a large number of users use a single internet facsimile as described above, many users are affected by even a minor trouble occurred in the internet facsimile function such as facsimile communication function, e-mail communication function, server function and printer function. Therefore, it is desired that a user is always able to easily know a current status of the internet facsimile.

SUMMARY OF THE INVENTION

An object of the present invention is to provide a network facsimile apparatus for enabling a client to easily observe a status of each section of the network facsimile apparatus in homepage format.

The present invention provides a network facsimile apparatus for enabling a client to observe the latest status icon in homepage format, by switching a status icon registered in a structured document for displaying status icons, corresponding to a status change, while transmitting the structured document corresponding to a request from the client.

The present invention provides a network facsimile apparatus having a storage for storing a structured document for displaying a status icon of each section of the network facsimile apparatus, an icon switching function for switching a status icon in the structured document corresponding to a status change of respective device, and a WWW server for enabling a structured document stored in the storage to be browsed.

The network facsimile configured described above enables a structured document stored in the storage to be browsed, while switches a status icon in the structured document corresponding to a status change of respective device, thereby making it possible to present a status icon in which the latest status is reflected to a client.

In addition, the present invention provides a network facsimile which refers to a table used in relating a plurality of divided device statuses to a plurality of icons and selects a changed status icon of a device whose status change is detected.

According to the above processing, since a plurality of divided device statuses are related to a plurality of status icons in the table, it is possible to determine a corresponding status icon promptly among from divided device statuses to rewrite a status icon name in the structured document, thereby making it possible to change a status icon readily.

In addition, the present invention provides a network facsimile which has a structured document in which update time and an instruction for instructing a client fetching the structured document while displaying an icon to request a file of the structured document again to the WWW server section when a predetermined time duration passes.

According to the above processing, since a structured document in which the latest status is always reflected by the icon switching section is transmitted to a client periodically, it is possible to automatically update a status icon to be displayed to the client.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF PREFERRED EMBODIMENT

An embodiment of the present invention will be described in detail with reference to drawings.

Figure 2:
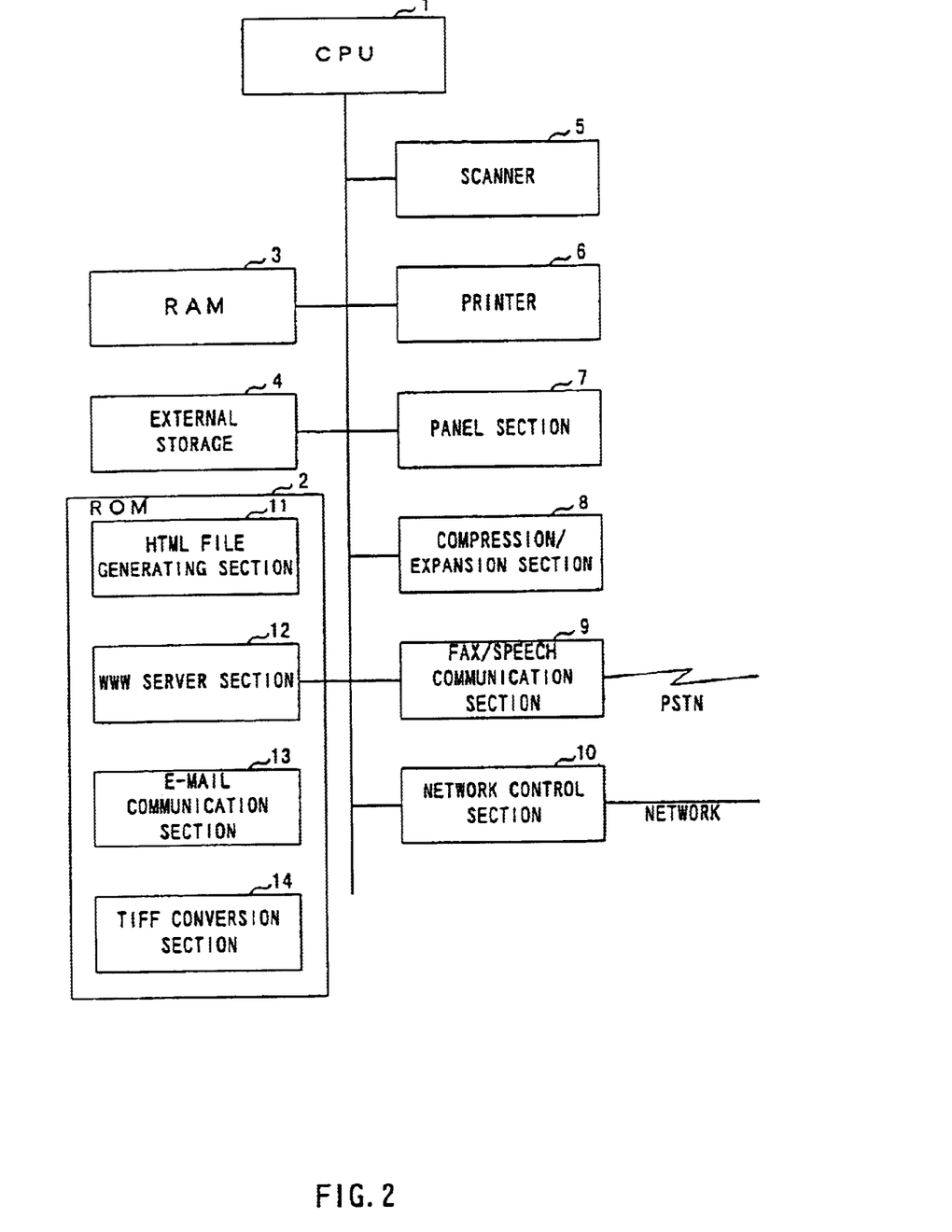
FIG. 2 is a function block diagram of a network facsimile apparatus according to an embodiment of the present invention.

FIG. 2 illustrates a function block diagram of a network facsimile apparatus according to this embodiment. ROM 2, RAM 3 and external storage 4 are connected to CPU 1 that operates by an operating system and is accessible to ROM 2, RAM 3 and external storage 4. Various programs such as processing program for a server side are stored at ROM 2. RAM 3 is used, for example, as a working area of programs stored at ROM 2. Compressed image data and HTML files are stored in external storage 4.

In addition, the network facsimile apparatus according to this embodiment has scanner 5, printer 6, panel section 7, compression/expansion section 8, FAX/speech communication section 9 and network control section 10 which operate under the control of CPU 1.

The network facsimile apparatus performs scanning of image data of, for example, document at scanner 5, and performs printing of scanned imaged and received image data at printer 6. A user is able to perform operations such as an instruction to scan image data and an enter of destination address using panel section 7. Compression/expansion section 8 performs expansion of received image data and compression of scanned, image data. FAX/speech communication section 9 performs facsimile communication and speech communication connecting to a PSTN. Network control section 10 controls network data communications and e-mail data communications.

The programs stored in ROM 2 include each program for HTML file generating section 11, WWW server section 12, e-mail communication section 13 and TIFF conversion section 14. Although each function of HTML file generating section 11, WWW server section 12, e-mail communication section 13 and TIFF conversion section 14 is provided under the respective program executed by CPU 1, the respective function will be described using respective numeral symbol provided to the respective program as illustrated in FIG. 2 as a matter of accommodation.

HTML file generating section 11 is a function block that converts statuses of scanner 5, printer 6, panel section 7 and FAX/speech communication section 9 such as idling, operating and error into HTML files readable in a homepage to register to a server.

WWW server section 12 provides a server function of, for example, performing communication with a WWW browser in accordance with HTTP protocol to exchange homepage data (HTML file).

E-mail communication section 13 performs transmission and reception of e-mail via a network, while functions as an e-mail server. In addition, TIFF conversion section 14 provides a function of converting coded facsimile data and document file data into TIFF format. In the case of transmitting facsimile data scanned at scanner 5 or stored by e-mail, TIFF conversion section 14 converts the facsimile data into TIFF format and generates an e-mail which contains the TIFF file as an attached file. In other words, the TIFF file is text-coded, and provided to a data section for an e-mail with attached file conforming to, for example, MIME. On the contrary, in the case of transmitting data received by e-mail by facsimile, an e-mail in text code is subjected to binary conversion and further converted into a TIFF file. TIFF conversion section 14 opens the TIFF file. When the file is a non-compressed, compression/expansion section 8 provides compression processing such as MH, and then the resultant data is transmitted.

Figure 3:
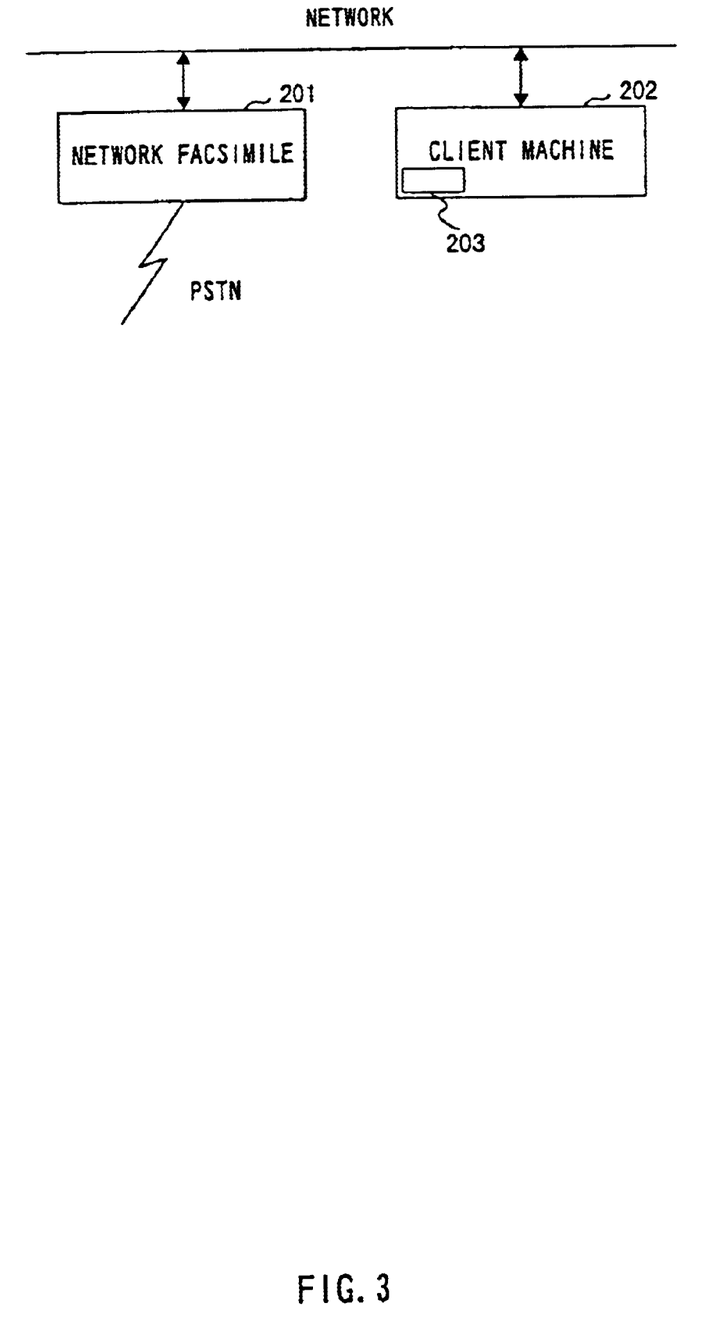
FIG. 3 is a configuration diagram of a system in which the network facsimile apparatus according to the above embodiment is connected to a client machine.

FIG. 3 illustrates a system configuration in the case of connecting a network facsimile apparatus according to this embodiment to a PSTN and a network. In FIG. 3, network facsimile apparatus 201 is connected to the PSTN while connected to the network through a network interface. It is possible to browse at client machine 202 a homepage provided at network facsimile apparatus 201 by operating a WWW browser at client machine 202.

Figure 4:
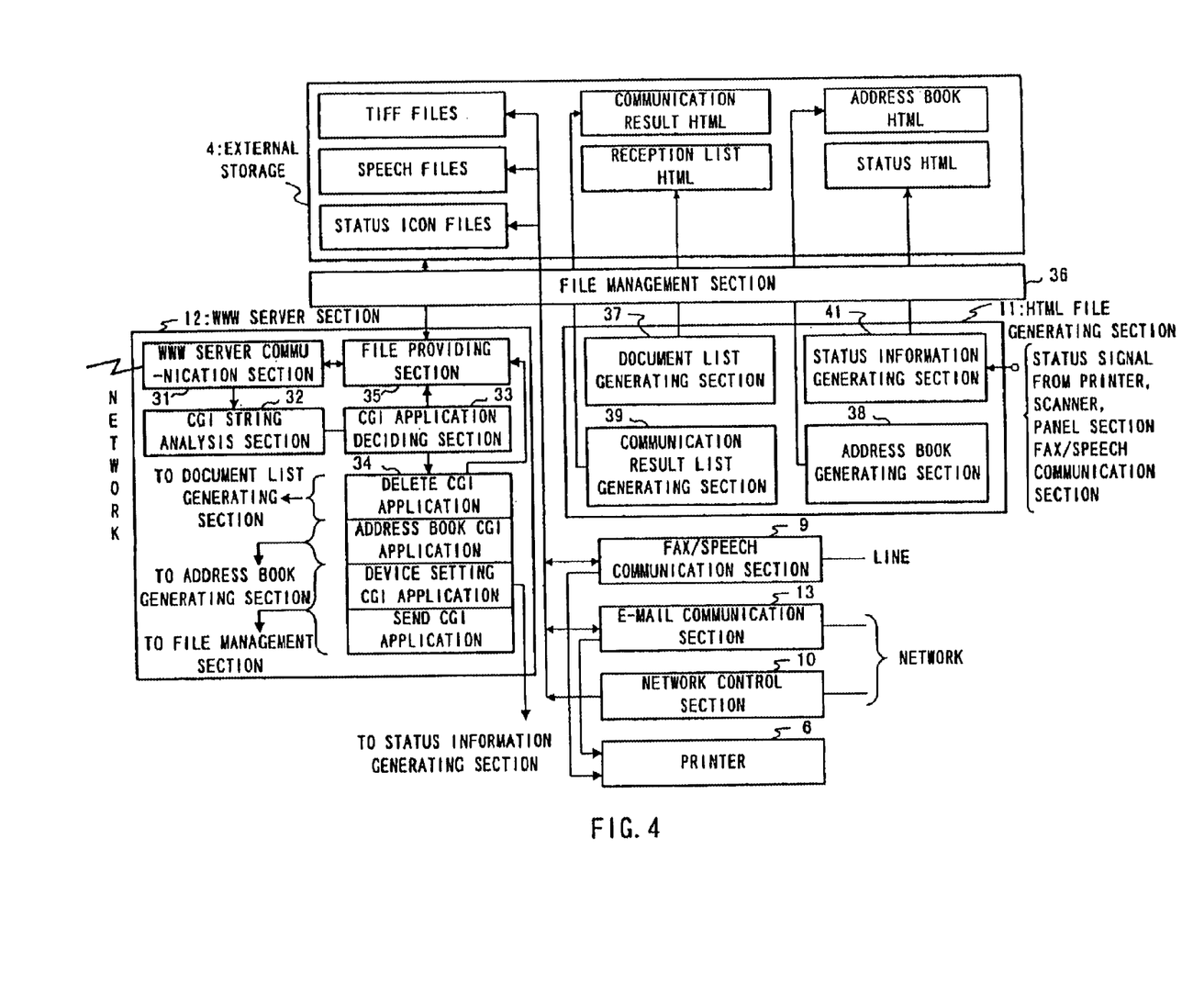
FIG. 4 is a function block diagram illustrating a flow of a part of processing in the network facsimile apparatus according to the above embodiment.

FIG. 4 illustrates a function block diagram for HTML file generating section 11, WWW server section 12, e-mail communication section 13, and FAX/speech communication section 9, and a flow of data processing between the blocks.

In WWW server section 12, WWW server communication section 31 communicates with a WWW browser operating at client machine 202 in accordance with HTTP protocol. A command received at WWW server communication section 31 from client machine 202 is analyzed at CGI string analysis section 32.

CGI string analysis section 32 analyzes a CGI string contained in the received data, provides the analyzed result to CGI application deciding section 33 to start corresponding CGI application 34. CGI application 34 executes the predetermined processing using the received data. CGI application 34 includes applications for, for example, send, delete of HTML document, generation of address book, and device setting. For example, a send CGI application controls corresponding devices to perform facsimile transmission or e-mail transmission of a document designated by a client machine to a designated destination.

File providing section 35 receives a file, whose file request is provided from client machine 202, from file management section 36 to provide to WWW server communication section 31. When the file request does not requires the CGI processing, file providing section 35 requires a corresponding file to file management section 36.

HTML file generating section 11 has document list generating section 37 that generates a HTML file of document list and address book generating section 38 that generates a HTML file of address book.

Document list generating section 37 generates a HTML file of reception list indicative of received e-mail and received FAX and performs a delete, edit and move of a part of the HTML file according to an instruction provided from CGI application 34 and received data.

Address book generating section 38 modifies the HTML file of address book according to an instruction from the address book CGI application and received data. Further, address book generating section 38 executes processing to incorporate the latest address table data into the HTML file of address book when power is turned on and the content of the address book is changed.

In addition, HTML file generating section 11 has communication result list generating section 39 and status information generating section 41. Communication result list generating section 39 receives log information indicative of communication result from FAX/speech communication section 9 and e-mail communication section 13 to generate and update the HTML file indicative of the communication result list.

Status information generating section 41 fetches status signals indicative of respective statuses from scanner 5, printer 6, panel section 7 and FAX/speech communication section 9, and generates and updates a HTML file in which each status of above sections are registered. For example, when idling, operating, and error such as jam and lack of toner are assumed as statuses of a printer, status information generating section 41 generates each icon for appealing respective status visually, and registers a corresponding status icon to the HTML file (status html) according to a status signal from printer 6.

FAX/speech communication section 9 receives an instruction of transmission processing, transmission document number, a FAX number of a destination terminal from a send application. When the transmission document number is provided, FAX/speech communication section 9 fetches transmission data (image) of the corresponding document number from external storage 4, inputs the image data to a transmission buffer, and transmits the data to the FAX number of the destination terminal connecting to the PSTN.

E-mail communication section 13 receives an instruction of transmission processing, transmission document number, an e-mail address of a destination terminal from the send CGI application. When the transmission document number is provided, E-mail communication section 13 fetches transmission data of the corresponding document number from external storage 4, inputs the image data to a transmission buffer, and transmits the data to the e-mail address of the destination terminal connecting to a network such as the internet by a LAN or dial up.

An operation of the network facsimile apparatus according to this embodiment will be described next. The following description will illustrate an operation for displaying an icon indicative of a current status of each section of the network facsimile apparatus at client machine 202 using a flowchart in FIG. 5.

Figure 5:
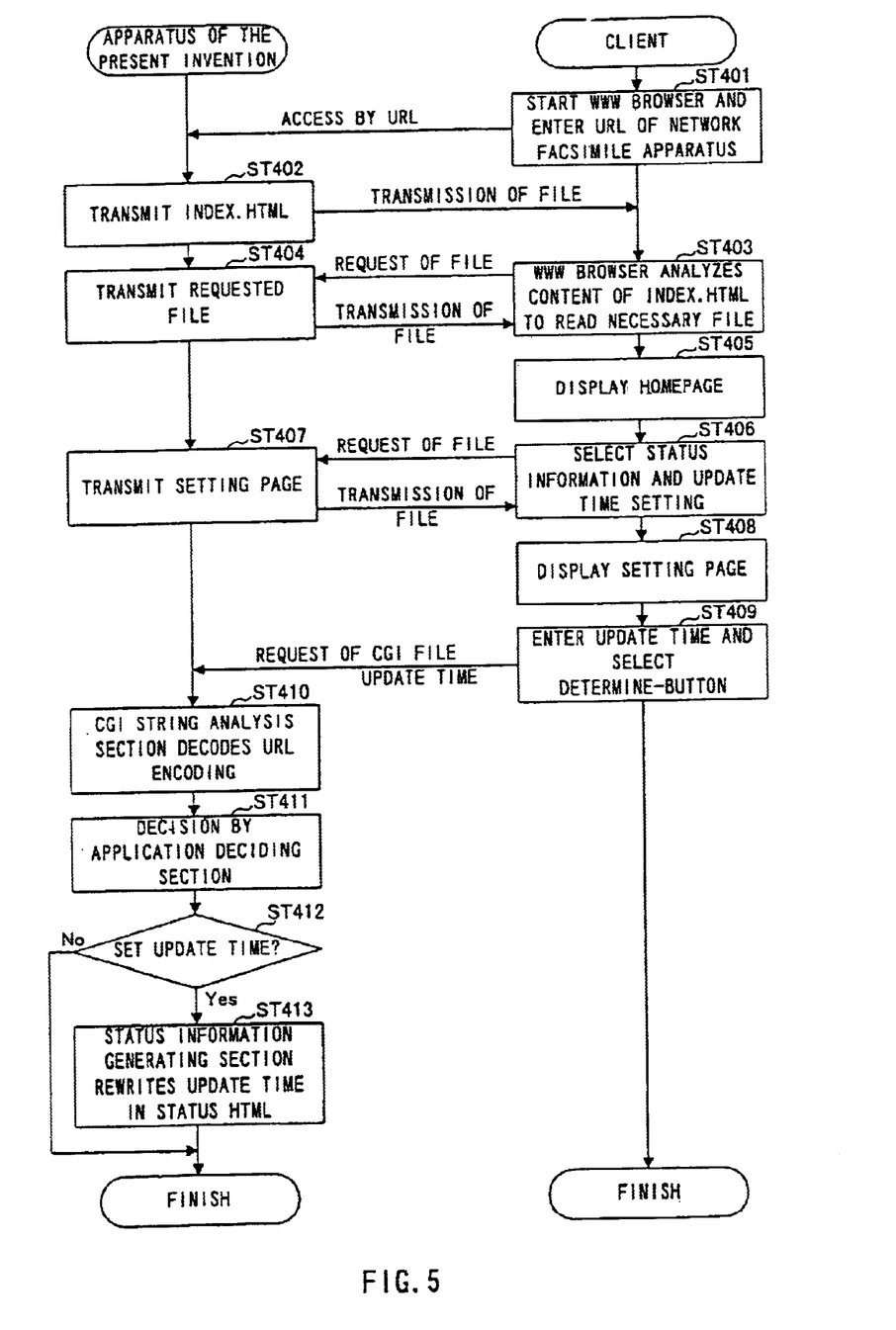
FIG. 5 is a flowchart illustrating the processing of homepage display performed by a update time is set in the above embodiment.

The network facsimile is in a stand-by state until a homepage address (URL address) is entered.

Client machine 202 connected to a network starts a WWW browser (browsing software), and enters the URL of the network facsimile apparatus to access (ST401).

In the accessed network facsimile apparatus, WWW server section 12 receives the URL to response. When WWW server section 12 receives the URL from client machine 202, WWW server section 12 transmits an index file (index.html) that is a HTML document for displaying a file of a homepage main page (ST402).

The WWW browser at client machine 202 analyzes the content of index.html and transmits a command for requesting a necessary file to WWW server section 12 (ST403).

Figure 6:
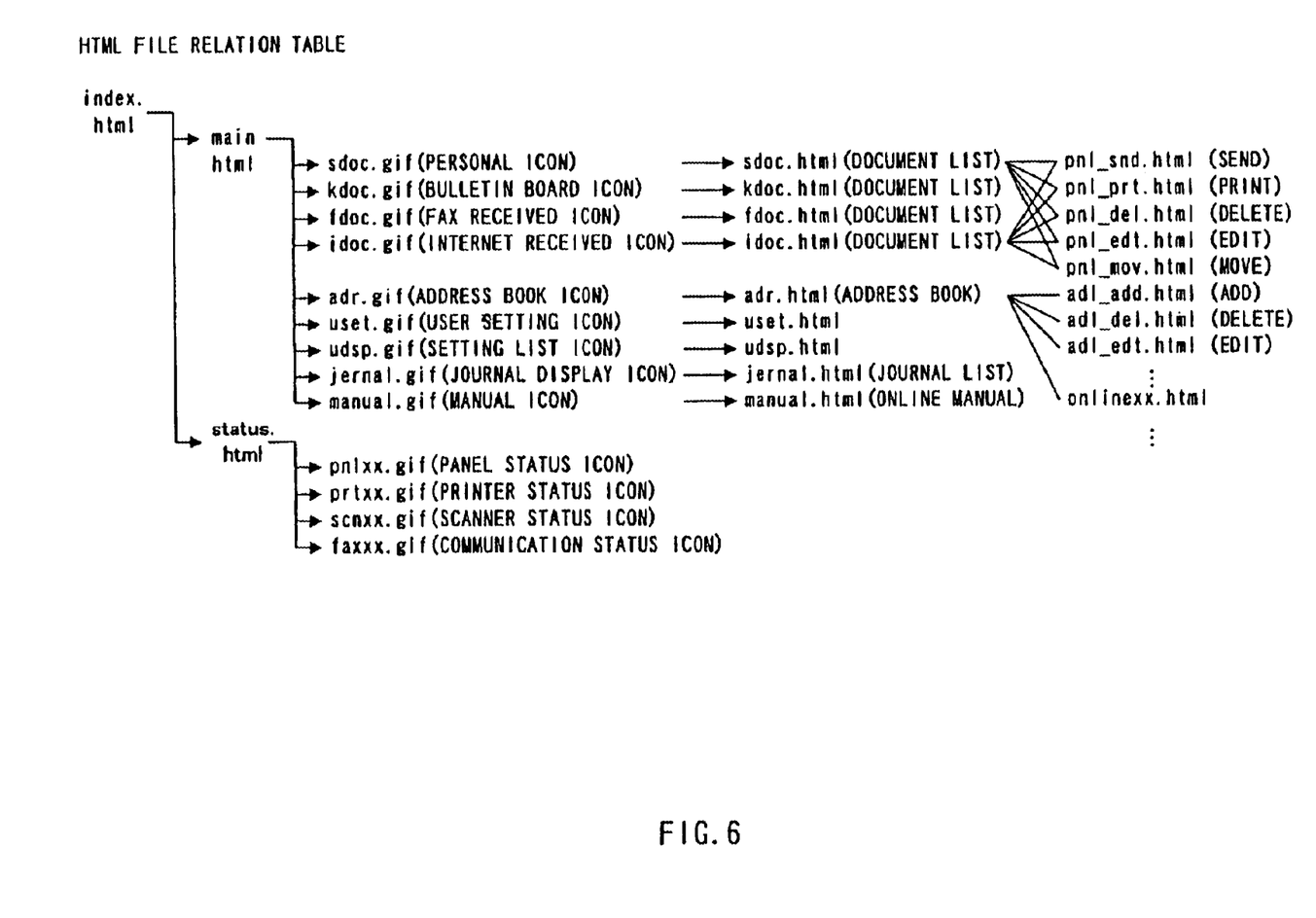
FIG. 6 is a diagram illustrating a relation table of HTML files.

As illustrated in FIG. 6, the index file (index.html) is composed of a main file (main.html) and a status file (status.html). Client machine 202 provides a file request for the main file and status file to WWW server section 12. Since the main file includes various files composing the homepage main page such as personal icon and bulletin board icon, the file request for such files are provided. Since the status file includes various files composing a status page section with a panel status icon (pnlxx.gif) indicative of a status of panel section 7, printer status icon (prtxx.gif) indicative of printer 6, scanner status icon (scnxx.gif) indicative of scanner 5 and communication status icon (faxxx.gif) indicative of FAX/speech communication section 9, the file request for such files are provided.

Figure 7:
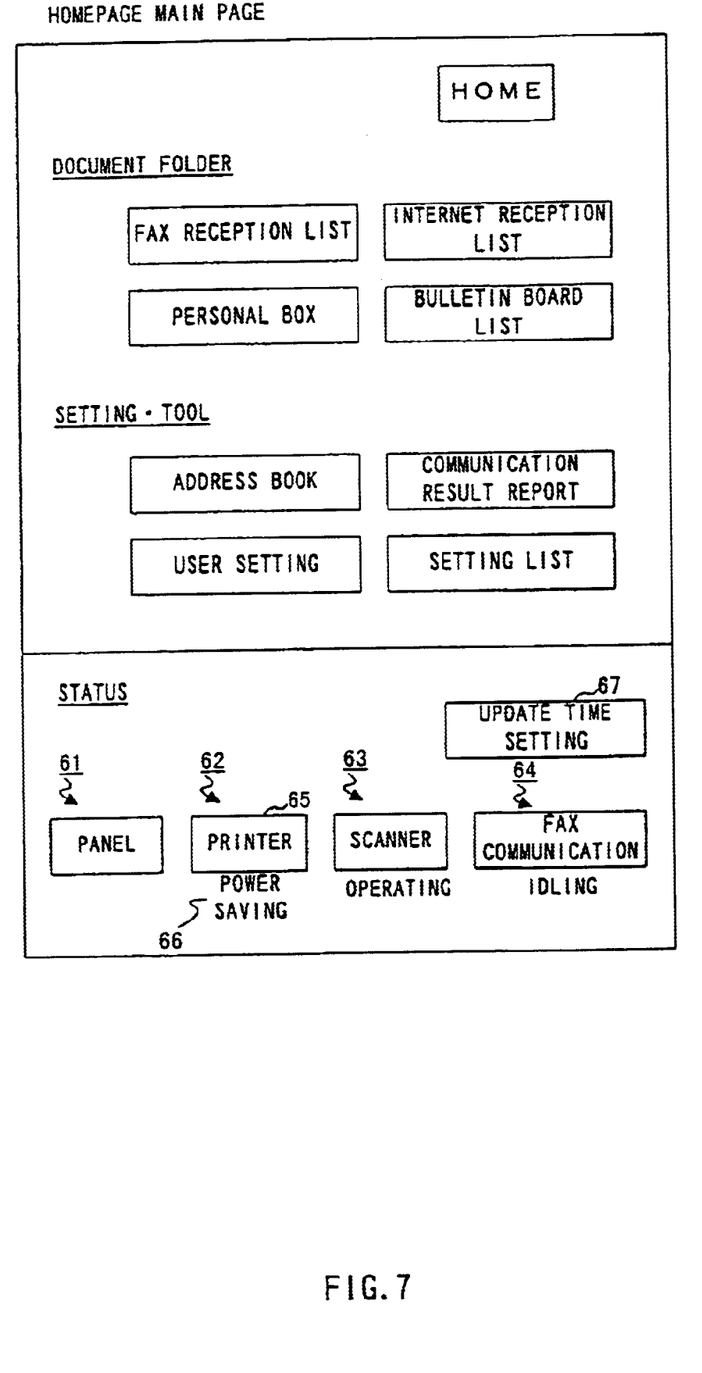
FIG. 7 is a structure diagram of a homepage main page.

Client machine 202 acquires the necessary files by providing the above file requests and displays the homepage main page (ST405). As illustrated in FIG. 7, the main page displays respective icon of document folder and setting/tool composed based on the main files and respective icon for status composed based on the status file.

Panel status icon 61, printer status icon 62, scanner status icon 63 and communication status icon 64 are respectively composed of a symbol mark having a form indicative of respective shape in general view and a comment indicative of respective status described just below respective symbol mark. The symbol mark has different display colors according to statuses. It is, for example, designed that the color indicative of idling status is gray, the color indicative of operating is green and the color indicative of error is red. In this embodiment, the status is expressed by the display color of the symbol mark and the comment. In an example illustrated in FIG. 7., printer status icon 62 is composed of symbol mark 65 having the form indicative of printer shape in general view and comment 66="Power Saving" indicative of the status described just below symbol mark 65.

Figure 8:
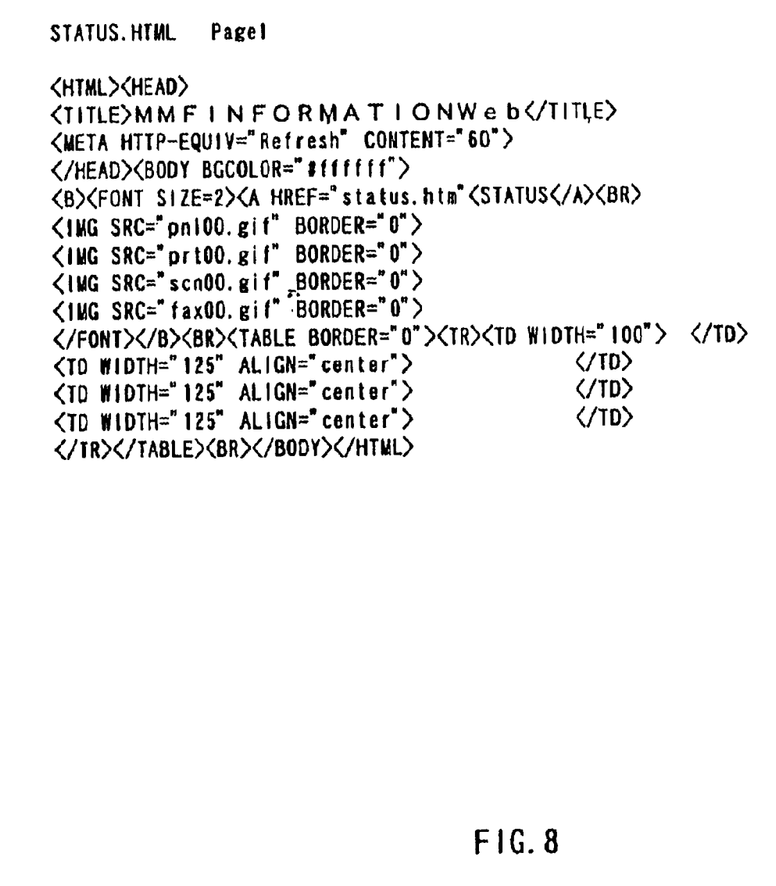
FIG. 8 is a diagram illustrating a source file of status html.

FIG. 8 illustrates a source file of the status file. A file name of status icon is set at a line of [IMG SRC= . . . ]. File names for panel status icon 61, printer status icon 62, scanner status icon 63, and communication status icon 64 are respectively [pn100.gif], [prt00.gif], [scn00.gif] and [fax00.gif]. Client machine 202 acquires the files of those status icons from the network facsimile apparatus and displays the status page section illustrated in FIG. 7.

In addition, a time to update the status icon is set at a line of [META HTTP-EQUV= . . . ] in the status file. The update time is determined by [Refresh CONTENT="xx"].

A status file generating operation in the network facsimile apparatus will be described next. Status html is stored in external storage 4, and when status information generating section 41 detects a status change of each section, the section 41 updates the corresponding data of status html.

Figure 10:
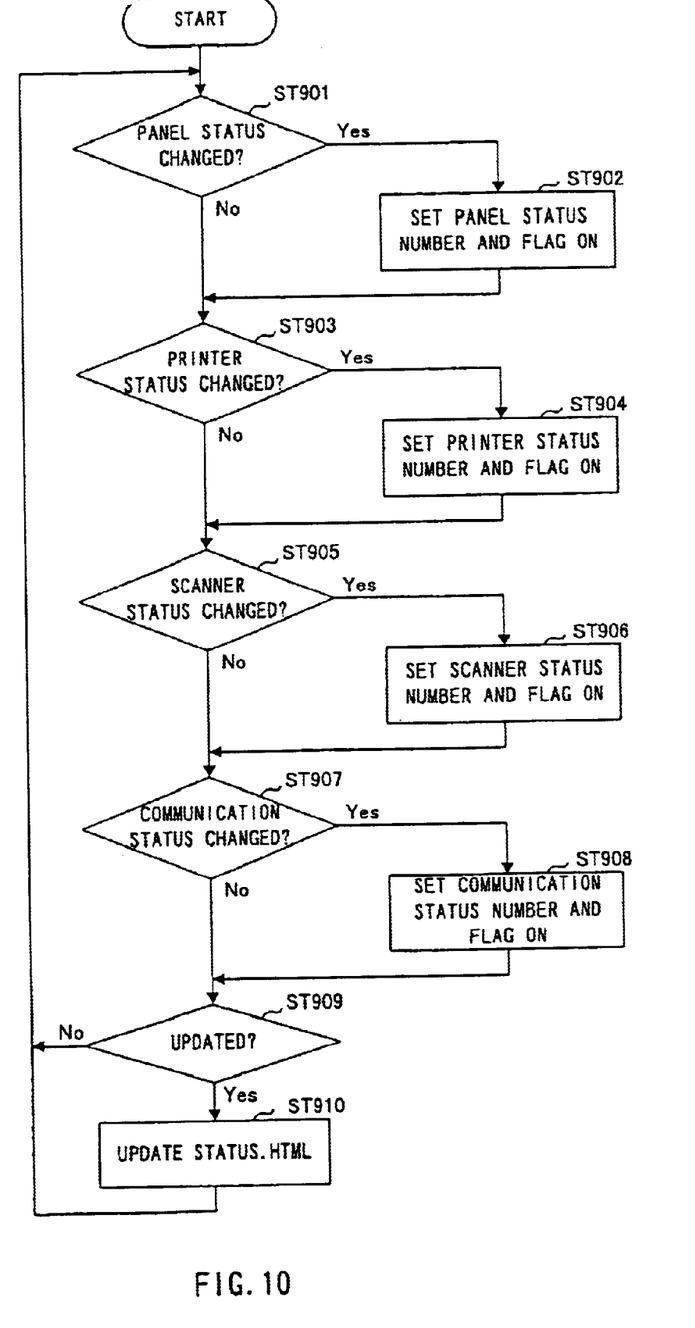
FIG. 10 is a flowchart illustrating an update operation for status html in the network facsimile apparatus according to the above embodiment.

FIG. 10 illustrates a flowchart of status html update operation in status information generating section 41. Scanner 5, printer 6, panel section 7 and FAX/speech communication section 9 manage respectively their own operation status and notify CPU 1 of status signal indicative of current status periodically or on real time. Otherwise, each section stores its own operation status in a device, and CPU 1 fetches the status signal.

Status information generating section 41 checks the status signal of panel section 7, and decides whether or not there is an difference between a panel status at the time of previous check and a current panel status (ST901). When a status change is detected, status information generating section 41 sets a panel status number corresponding to the current panel status and sets a flag on (ST902). The flag is to illustrate that a status change occurs. The panel status number is provided to each panel status to be displayed with panel status icon 61. The other status numbers are provided in the same way. When a status change is not detected, the processing moves to a check of printer 6.

The status signal of printer 6 is next checked, and it is decided whether or not there is a difference between a printer status at the time of previous check and a current printer status (ST903). When a status change is detected, status information generating section 41 sets a panel status number corresponding to the current prnter status and sets a flag on (ST904). When a status change is not detected, the processing moves to a check of scanner 5.

The status signal of scanner 5 is next checked, and it is decided whether or not there is a difference between a scanner status at the time of previous check and a current scanner status (STS905). When a status change is detected, status information generating section 41 sets a scanner status number corresponding to the current scanner status and sets a flag on (ST906). When a status change is not detected, the processing moves to a check of FAX/speech communication section 9.

The status signal of FAX/speech communication section 9 is next checked, and it is decided whether or not there is a difference between a communication status at the time of previous check and a current communication status (STS907). When a status change is detected, status information generating section 41 sets a communication status number corresponding to the current communication status and sets a flag on (ST908).

When the status check of each section is finished as described above, it is checked whether or not there is a device whose flag is set on (ST909). When there is the device whose flag is set on, status information generating section 41 updates the status html (ST910).

Figure 9:
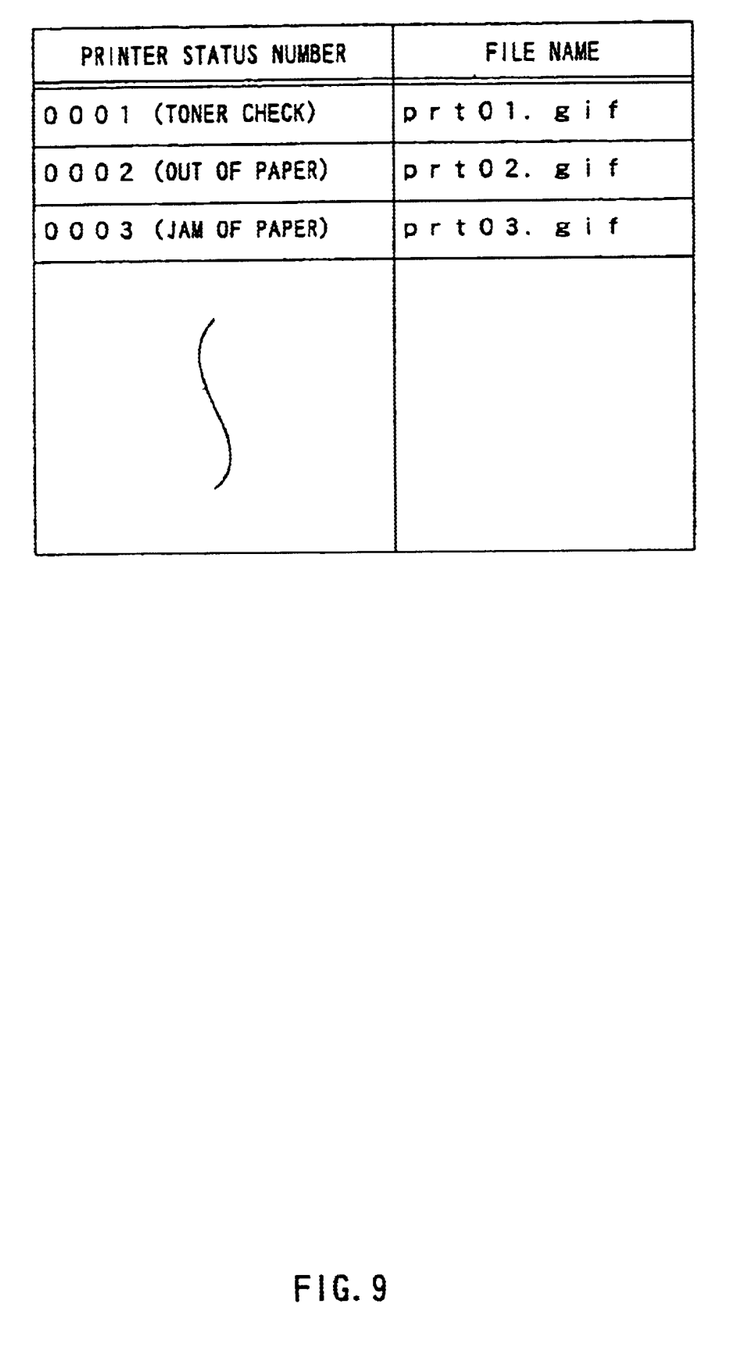
FIG. 9 is a diagram illustrating a relation table of printer status number and file name.

The update of status html is described using a printer as an example. FIG. 9 illustrates a relation table of printer status number and file name. The printer status number is provided corresponding to each status occurring at printer 6. In the relation table, file names (gif file) of printer status icons are registered corresponding to respective printer status numbers. Each of the gif files includes a comment and a symbol mark indicative of a printer status visually corresponding to respective printer status number. The gif files of the status icons registered in the relation table are stored in external storage 4 as a status icon file group.

In ST910, status information generating section 41 refers to the relation table illustrated in FIG. 9, acquires a file name of status icon corresponding to a status number of a device whose flag is set on, and fetches a status file illustrated in FIG. 8 from external storage 4. Assume that a status of printer 6 is changed from a power saving status to an out-of-paper status. In this case, "prt00.gif" is set as a file name of printer status icon in the status html which is not updated. Status information generating section 41 rewrites a file name from "prt00.gif" to "prt02.gif" in the updating processing. In the file of "prt02.gif", a printer status icon composed of a symbol mark for displaying a printer symbol in red and a comment of "out of paper" is registered. Accordingly, when client machine 202 reads the updated status html, printer status icon 62 is changed to an icon indicative of out of paper.

Figure 11:
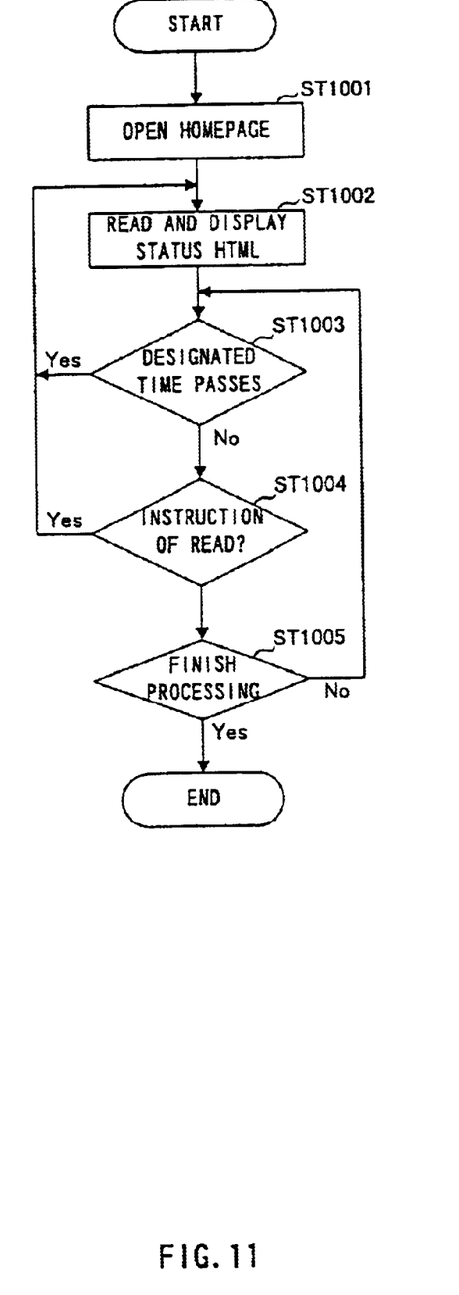
FIG. 11 is a flowchart of reading timing of status html in a client machine according to the above embodiment.

As described above, in the network facsimile apparatus, status information generating section 41 directs statuses of scanner 5, printer 6, panel section 7 and FAX/speech communication section 9 in order to reflect a status icon corresponding to a changed status in a status html when a status changed. FIG. 11 illustrates a flowchart of reading timing of status html in client machine 202. As described above, when client machine 202 opens a homepage main page illustrated in FIG. 7 (ST1001), client machine 202 reads the status html and displays status icons concerning the status and others (ST1002). When the update time passes with the status icons displayed on the homepage main page (ST1003), client machine 202 reads the status html again from the network facsimile apparatus again and displays the status icons by the newly read status html. The update time is designated by "Refresh CONTENT=xx" in the source file (status html) in FIG. 8. When the line for the update time described above is inserted to the read status html, the WWW browser updates the status html every time when the update time passes. According to the aforementioned processing, a changed status icon is displayed when a device change occurs at a device in the network facsimile apparatus during a designated time duration.

In addition, when a user instructs a reading before the update time (ST1004), the WWW browser reads the status html from the network facsimile apparatus to update even though the time does not reaches the update time. In line 5 of the source file of the status html illustrated in FIG. 8 (A HREF= . . . ), a line of instruction for reading "status.html" when [status] is selected on the displayed page is inserted. Accordingly, at ST1004, when an icon indicative of [status] is selected with the main page illustrated in FIG. 7 displayed, client machine 202 moves to ST1002 and reads the status html again. The above processing of each step is repeated until the display of the main page is finished (ST1005).

According to the aforementioned processing, a user is able to observe a updated status icon instantly by selecting the icon indicative of [status] whenever the user wants to know a current status of the network facsimile apparatus.

An operation for setting a status information update time in client machine 202 will be described using the flowchart in FIG. 5 again. Assume that update time setting icon 67 is selected in FIG. 7 when the homepage main page is displayed at ST405. When update time setting icon 67 is selected, the WWW browser provides a request for setting page file (ST406).

Figure 12:
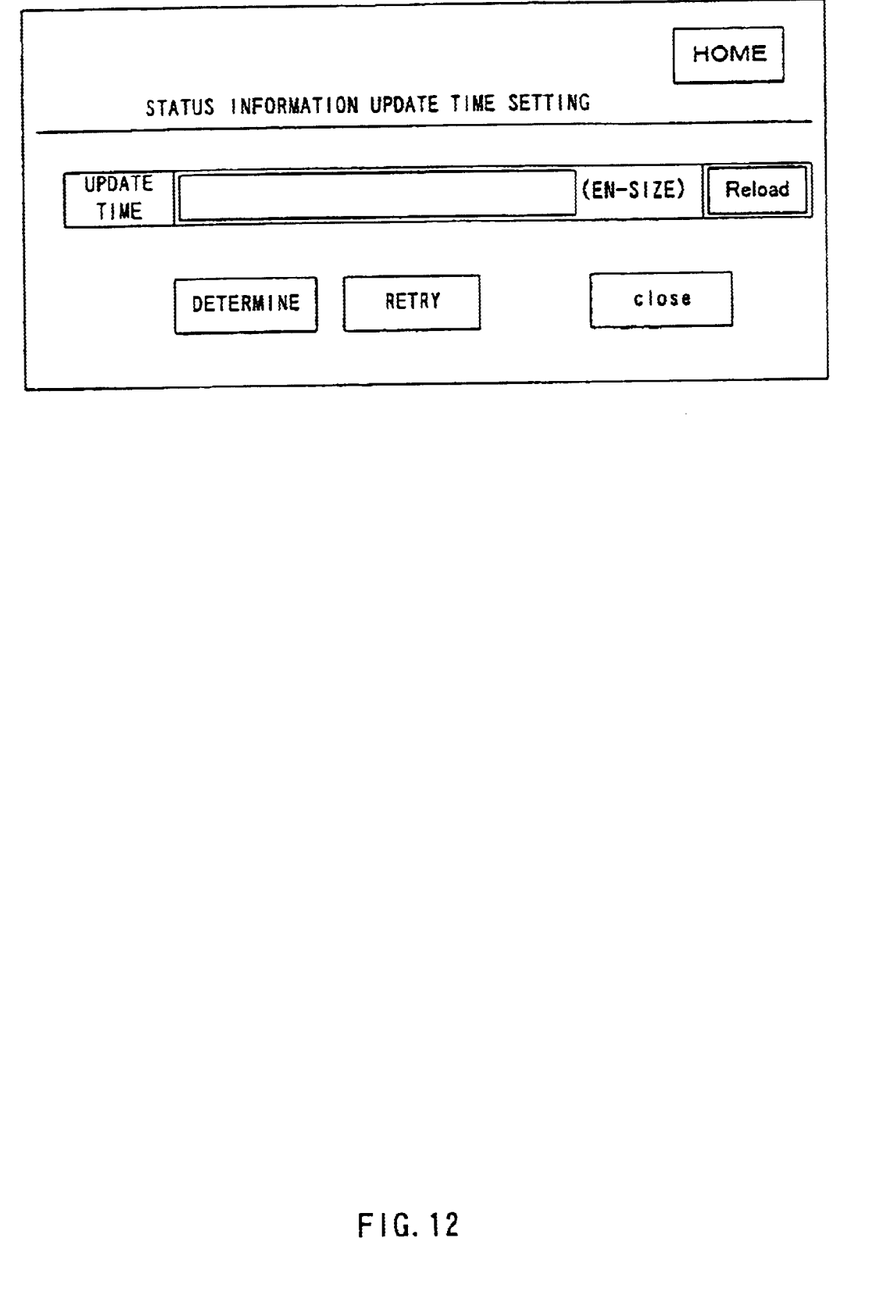
FIG. 12 is a structure diagram of setting page for update time of status information in the above embodiment.

FIG. 12 illustrates a structure example of setting page for setting a update time. A HTML file for the setting page is stored in external storage 4. The WWW server section 12 receives the file request, requests the corresponding file to file management section 36, and transmits the HTML file of setting page read from external storage 4 to client machine 202 (ST407).

Client machine 202 receives the HTML file of setting page and displays the setting page illustrated in FIG. 12 (ST408). The setting page has a box adapted to enter a update time of status information. A user enters a desired update time in the box and pushes a determine-button. When the determine-button is pushed, client machine 202 outputs a CGI processing request for requesting the processing for updating a designated time in the status html (ST409).

In WWW server section 12, CGI string analysis section 32 decodes a URL encoded CGI string in received data to analyze (ST410), and provides the analyzed result to CGI application deciding section 33. CGI application deciding section 33 decides an application to which CGI processing is requested (ST411), and starts a device setting CGI application to provide the update time data when the device setting CGI application is designated (ST412). When the processing request concerns the update time of status html, the device setting CGI application provides the update time data to status information generating section 41 and instructs to update the update time data in the status html to the designated update time. According to the aforementioned processing, status information generating section 41 rewrites the corresponding data in the status html to the data designated by the client side (ST413).

The aforementioned processing enables client machine 202 to instruct a update time of status information to the network facsimile. The instruction of the update time is completed only by entering any time on a setting page automatically displayed from the network facsimile apparatus.

As described above in detail, according to the present invention, it is possible to provide a network facsimile apparatus for enabling a client to observe a status of each section of the apparatus easily in homepage format.

The present invention is not limited to the above described embodiments, and various variations and modifications may be possible without departing from the scope of the present invention.

This application is based on the Japanese Patent Application No.HEI 11-19591 filed on Jan. 28, 1999, entire content of which is expressly incorporated by reference herein.

What is claimed is:

1. A communication apparatus connected to a terminal apparatus via a network, the communication apparatus comprising:

a detector that detects at least a part of the communication apparatus to obtain status information regarding the detected part of the communication apparatus;

a generator that generates a HTML file indicating the status information and having a predetermined icon, the status information comprising an image file indicating a status of the detected part of the communication apparatus; and a communicator that transmits the HTML file to the terminal apparatus when a request for the HTML file, including the status information and the predetermined icon, is received from the terminal apparatus, the status information being displayable at the terminal apparatus, said communicator further transmitting the latest status information when the predetermined icon displayed at the terminal apparatus is clicked while the status information is displayed.

2. The communication apparatus according to claim 1, said part comprising a scanner that scans documents to obtain image data, wherein said detector detects said scanner to obtain the status information regarding the scanner.

3. The communication apparatus according to claim 1, said part comprising a printer that prints image data, wherein said detector detects said printer to obtain the status information regarding the printer.

4. The communication apparatus according to claim 3, wherein the status information comprises at least one of a toner check, out of paper condition and a paper jam condition.

5. The communication apparatus according to claim 1, wherein said detector periodically detects the part of the communication apparatus.

6. The communication apparatus according to claim 1, wherein said generator updates the HTML file indicating the status information, in accordance with a change in status of the part of the communication apparatus.

7. The communication apparatus according to claim 6, further comprising a status information memory that stores at least one of a plurality of image files, each image file visually indicating the status information, wherein an image file is output to said generator to update the status information.

8. The communication apparatus according to claim 7, wherein the image file comprises a GIF file.

9. The communication apparatus according to claim 1, wherein the status information includes a comment indicating the status of the detected part of the communication apparatus.

10. The communication apparatus according to claim 1, said predetermined icon comprising a status icon.

11. A scanning apparatus connected to a terminal apparatus via a network, the scanning apparatus comprising:

a scanner that scans documents to obtain image data;

a detector that detects said scanner to obtain status information regarding said scanner;

a generator that generates a HTML file indicating the status information and having a predetermined icon, the status information comprising an image file that visually indicates a current status of said scanner; and a communicator that transmits the HTML file to the terminal apparatus when a request for the status information is received from the terminal apparatus, the HTML file, including the status information and the predetermined icon being displayable at the terminal apparatus, said communicator further transmitting the latest status information, when the predetermined icon displayed at the terminal apparatus is clicked while the status information is displayed;

wherein said generator updates the HTML file indicating the status information, in accordance with a change in status of said scanner.

12. A recording apparatus connected to a terminal apparatus via a network, the recording apparatus comprising:

a printer that prints image data;

a detector that detects said printer to obtain status information regarding said printer;

a generator that generates a HTML file indicating the status information and having a predetermined icon, the status information comprising an image file that visually indicates a current status of said printer; and a communicator that transmits the HTML file to the terminal apparatus when a request for the status information is received from the terminal apparatus, the status information being displayable at the terminal apparatus, said communicator further transmitting the latest status information when the predetermined icon displayed at the terminal apparatus is clicked while the status information is displayed;

wherein said generator updates the HTML file indicating the status information, in accordance with a change in status of said printer.

13. A method for checking a status of a communication apparatus connected to a terminal apparatus via a network, the method comprising:

detecting at least a part of the communication apparatus to obtain status information regarding the detected part of the communication apparatus;

generating a HTML file indicating the status information and having a predetermined icon, the status information comprising an image file indicating a status of the detected part of the communication apparatus; and transmitting the HTML file to the terminal apparatus when a request for the status information is received from the terminal apparatus, the HTML file, including the status information and the predetermined icon, being displayable at the terminal apparatus and, transmitting the latest status information when the predetermined icon displayed at the terminal apparatus is clicked while the status information is displayed.

14. The method according to claim 13, wherein the detected part of the communication apparatus comprises a scanner that in configured to scan documents to obtain image data, and the detecting detects the scanner to obtain the status information.

15. The method according to claim 13, wherein the detected part of the communication apparatus comprises a printer that prints image data, and the detecting detects the printer to obtain the status information.

16. The method according to claim 15, wherein the status information comprises at least one of a toner check, an out of paper condition and a paper jam condition.

17. The method according to claim 13, further comprising periodically detecting the part of the communication apparatus.

18. The method according to claim 13, wherein the generating updates the HTML file indicating the status information, in accordance with a change in status of the detected part of the communication apparatus.

19. The method according to claim 18, further comprising storing at least one of a plurality of image files, each image file visually indicating the status information, and outputting an image file to update the status information.

20. The method according to claim 19, wherein the image file comprises a GIF file.

21. The communication apparatus according to claim 13, wherein the status information includes a comment indicating the status of the detected part of the communication apparatus.

22. The communication apparatus according to claim 13, said predetermined icon comprising a status icon.

23. A method for checking a status of a scanner connected to a terminal apparatus via a network, the method comprising:

detecting the scanner to obtain status information regarding the scanner;

generating a HTML file indicating the status information and having a predetermined icon, the status information comprising an image file that visually indicates a current status of the scanner;

transmitting the HTML file to the terminal apparatus when a request for the status information is received from the terminal apparatus, the HTML file, including the status information and the predetermined icon being displayable at the terminal apparatus,     transmitting the latest status information when the predetermined icon displayed at the terminal apparatus is clicked while the status information is displayed, and     updating the HTML file indicating the status information, in accordance with a change in status of the scanner.

24. A method for checking a status of a printer connected to a terminal apparatus via a network, the method comprising:

detecting the printer to obtain status information regarding the printer;

generating a HTML file indicating the status information and having a predetermined icon, the status information including an image file that visually indicates a current status of the printer;

transmitting the HTML file to the terminal apparatus when a request for the status information is received from the terminal apparatus, the HTML file, including the status information and the predetermined icon, being displayable at the terminal apparatus, and     transmitting the latest status information, when the predetermined icon displayed at the terminal apparatus is clicked while the status information is displayed, and     updating the HTML file indicating the status information, in accordance with a change in status of the printer.

25. The method according to claim 23, further comprising scanning documents by the scanner to obtain image data.

26. The method according to claim 24, further comprising printing image data by the printer.

* * * * *